(12) United States Patent
Zheng et al.

(10) Patent No.: US 11,967,316 B2
(45) Date of Patent: Apr. 23, 2024

(54) AUDIO RECOGNITION METHOD, METHOD, APPARATUS FOR POSITIONING TARGET AUDIO, AND DEVICE

(71) Applicant: Tencent Technology (Shenzhen) Company Limited, Shenzhen (CN)

(72) Inventors: Jimeng Zheng, Shenzhen (CN); Ian Ernan Liu, Shenzhen (CN); Yi Gao, Shenzhen (CN); Weiwei Li, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 521 days.

(21) Appl. No.: 17/183,209

(22) Filed: Feb. 23, 2021

(65) Prior Publication Data
US 2021/0174792 A1 Jun. 10, 2021

Related U.S. Application Data

(63) Continuation of application No. PCT/CN2019/121946, filed on Nov. 29, 2019.

(30) Foreign Application Priority Data

Nov. 30, 2018 (CN) .......................... 201811455880.6

(51) Int. Cl.
*G10L 15/22* (2006.01)
*G01S 3/80* (2006.01)
(Continued)

(52) U.S. Cl.
CPC ............ *G10L 15/20* (2013.01); *G01S 3/8006* (2013.01); *G01S 3/802* (2013.01); *G10L 15/08* (2013.01);
(Continued)

(58) Field of Classification Search
None
See application file for complete search history.

(56) References Cited

U.S. PATENT DOCUMENTS 9,640,179 B1 * 5/2017 Hart .................... G10L 21/0208
9,734,822 B1 * 8/2017 Sundaram ............... G10L 15/08
(Continued)

FOREIGN PATENT DOCUMENTS

| CN | 102809742 A | 12/2012 |
|---|---|---|
| CN | 103439688 A | 12/2013 |

(Continued)

OTHER PUBLICATIONS

Sina Hafezi et al., "Multiple Source Localization Using Estimation Consistency in the Time-Frequency Domain", 2017 IEEE International Conference on Acoustics, Speech and Signal Processing (ICASSP), Jun. 19, 2017, 3 pgs., Retrieved from the Internet: https://ieeexplore.ieee.org/document/7952209.

(Continued)

*Primary Examiner* — Seong-Ah A Shin
(74) *Attorney, Agent, or Firm* — Morgan, Lewis & Bockius LLP

(57) ABSTRACT

Embodiments of this application disclose method and apparatus for positioning a target audio signal by an audio interaction device, and an audio interaction device The method includes: obtaining audio signals in a plurality of directions in a space, and performing echo cancellation on the audio signal, the audio signal including a target-audio direct signal; obtaining weights of a plurality of time-frequency points in the audio signals, a weight of each time-frequency point indicating, at the time-frequency point, a relative proportion of the target-audio direct signal in the audio signals; weighting time-frequency components of the audio signal at the plurality of time-frequency points separately for each of the plurality of directions by using the (Continued)

weights of the plurality of time-frequency points, to obtain a weighted audio signal energy distribution; and obtaining a sound source azimuth corresponding to the target-audio direct signal in the audio signals accordingly.

20 Claims, 9 Drawing Sheets

(51) Int. Cl.
| | | |
|---|---|---|
| *G01S 3/802* | (2006.01) | |
| *G10L 15/08* | (2006.01) | |
| *G10L 15/20* | (2006.01) | |
| *G10L 21/0224* | (2013.01) | |
| *G10L 21/0232* | (2013.01) | |
| *G10L 25/51* | (2013.01) | |
| *G10L 21/0208* | (2013.01) | |
| *G10L 21/0216* | (2013.01) | |

(52) U.S. Cl.
CPC .......... *G10L 15/22* (2013.01); *G10L 21/0224* (2013.01); *G10L 21/0232* (2013.01); *G10L 25/51* (2013.01); *G10L 2015/088* (2013.01); *G10L 2021/02082* (2013.01); *G10L 2021/02166* (2013.01)

(56) References Cited

U.S. PATENT DOCUMENTS

| | | | |
|---|---|---|---|
| 11,158,335 B1* | 10/2021 | Ganguly | G10L 15/22 |
| 2004/0240680 A1 | 12/2004 | Rui et al. | |
| 2004/0252845 A1 | 12/2004 | Tashev | |
| 2014/0056435 A1* | 2/2014 | Kjems | G10L 15/20 |
| | | | 381/317 |
| 2015/0304766 A1* | 10/2015 | Delikaris-Manias | H04R 1/08 |
| | | | 381/92 |
| 2018/0033428 A1* | 2/2018 | Kim | G10L 21/0208 |
| 2018/0190282 A1* | 7/2018 | Mohammad | G10K 11/178 |
| 2019/0043491 A1* | 2/2019 | Kupryjanow | G10L 21/0208 |
| 2019/0172476 A1* | 6/2019 | Wung | G10L 21/0232 |
| 2019/0378531 A1* | 12/2019 | Jensen | G10L 21/0232 |
| 2020/0279557 A1* | 9/2020 | Li | G01S 3/86 |

FOREIGN PATENT DOCUMENTS

| | | |
|---|---|---|
| CN | 104103277 A | 10/2014 |
| CN | 106908755 A | 6/2017 |
| CN | 107241672 A | 10/2017 |
| CN | 107976651 A | 5/2018 |
| CN | 108322859 A | 7/2018 |
| CN | 109597022 A | 4/2019 |
| DE | 2019110272 A1 | 11/2019 |
| JP | 2002135642 A | 5/2002 |
| JP | 2010114554 A | 5/2010 |
| WO | WO 2017/218128 A1 | 12/2017 |

OTHER PUBLICATIONS

Extended European Search Report, EP19889548.4, dated Sep. 15, 2021, 11 pgs.
Sunit Sivasankaran et al., "Keyword-based Speaker Localization: Localizing a Target Speaker in a Multi-Speaker Environment", Interspeech 2018—19th Annual Conference of the International Speech Communication Association, Sep. 2018, Hyderabad, India, 6 pgs.
Takuya Higuchi et al., "Robust MVDR Beamforming Using Time-Frequency Masks for Online/Offline ASR in Noise", 2016 IEEE International Conference on Acoustics, Speech and Signal Processing (ICASSP), Mar. 20, 2016, XP032901597, 5 pgs.
Tencent Technology, WO, PCT/CN2019/121946, Mar. 3, 2020, 5 pgs.
Tencent Technology, IPRP, PCT/CN2019/121946, May 25, 2021, 6 pgs.
Tencent Technology, ISR, PCT/CN2019/121946, Mar. 3, 2020, 2 pgs.

* cited by examiner

AUDIO RECOGNITION METHOD, METHOD, APPARATUS FOR POSITIONING TARGET AUDIO, AND DEVICE

CROSS REFERENCE TO RELATED APPLICATIONS

This application is a continuation application of PCT Patent Application No. PCT/CN2019/121946, entitled "AUDIO RECOGNITION METHOD, AND TARGET AUDIO POSITIONING METHOD, APPARATUS AND DEVICE" filed on Nov. 29, 2019, which claims priority to Chinese Patent Application No. 201811455880.6, filed with the State Intellectual Property Office of the People's Republic of China on Nov. 30, 2018, and entitled "METHOD, FOR CALCULATING SOUND SOURCE AZIMUTH AND POSITIONING TARGET AUDIO, APPARATUS, AND DEVICE", all of which are incorporated herein by reference in their entirety.

FIELD OF THE TECHNOLOGY

Embodiments of this application relate to the field of audio interaction application technologies, and in particular, to an audio recognition method, a method and apparatus for positioning target audio by an audio interaction device, and an audio interaction device.

BACKGROUND OF THE DISCLOSURE

With the popularity of smart speakers and derivatives thereof, voice interaction between humans and machines has gradually become an important human-machine interaction manner. Audio interaction devices, such as smart speakers, provide speech recognition interfaces for people in daily life, to start voice interaction between humans and machines.

During voice interaction with a person, an audio interaction device needs to learn of a position of the person, that is, an orientation of a sound source corresponding to a target voice, to directionally pick up the voice, perform noise reduction processing, and enhance the target voice at the same time, thereby improving the quality of a voice signal.

Specifically, a sound in a target direction, that is, the target voice, is enhanced based on a beamforming algorithm and the like. Such a process depends on the target direction, that is, an azimuth describing the direction of the target voice. In an existing implementation, the beamforming algorithm requires a system to pre-specify an azimuth of a target voice, and the beamforming algorithm is quite sensitive to the accuracy of the azimuth.

Therefore, improvement of azimuth accuracy becomes a bottleneck in improving the quality of a voice signal and the performance of voice interaction.

SUMMARY

To resolve the technical problem in the related art that an azimuth cannot be obtained accurately, embodiments of this application provide an audio recognition method, a method and an apparatus for positioning target audio by an audio interaction device, and an audio interaction device.

An audio recognition method according to an embodiment of this application includes:
obtaining audio signals collected in a plurality of directions in a space, the audio signal comprising a target-audio direct signal;
performing echo cancellation on the audio signals;
obtaining weights of a plurality of time-frequency points in the echo-canceled audio signals, a weight of each time-frequency point indicating a relative proportion of the target-audio direct signal in the audio signals at the time-frequency point;
weighting time-frequency components of the audio signals at the plurality of time-frequency points separately for each of the plurality of directions by using the weights of the plurality of time-frequency points, to obtain a weighted audio signal energy distribution of the audio signals in the plurality of directions;
obtaining a sound source azimuth corresponding to the target-audio direct signal in the audio signals by using the weighted audio signal energy distribution of the audio signals in the plurality of directions; and performing audio recognition to the audio signals based on the sound source azimuth corresponding to the target-audio direct signal.

A method for positioning target audio by an audio interaction device according to an embodiment of this application includes:
obtaining, by the audio interaction device, audio signals collected in a plurality of directions in a space, the audio signal comprising a target-audio direct signal;
performing echo cancellation on the audio signals;
obtaining, by the audio interaction device, weights of a plurality of time-frequency points in the echo-canceled audio signals, a weight of each time-frequency point indicating a relative proportion of the target-audio direct signal in the audio signals at the time-frequency point;
weighting time-frequency components of the audio signals at the plurality of time-frequency points separately for each of the plurality of directions by using the weights of the plurality of time-frequency points, to obtain a weighted audio signal energy distribution of the audio signals in the plurality of directions;
obtaining a sound source azimuth corresponding to the target-audio direct signal in the audio signals by using the weighted audio signal energy distribution of the audio signals in the plurality of directions; and positioning a sound source position of the target audio in the audio interaction according to the sound source azimuth.

An audio recognition apparatus according to an embodiment of this application includes:
a signal obtaining module, configured to obtain audio signals collected in a plurality of directions in a space, the audio signal comprising a target-audio direct signal;
an echo cancellation module, configured to perform echo cancellation on the audio signals;
a weight calculation module, configured to obtain weights of a plurality of time-frequency points in the echo-canceled audio signals, a weight of each time-frequency point indicating a relative proportion of the target-audio direct signal in the audio signals at the time-frequency point;
a spatial spectrum calculation module, configured to weight, time-frequency components of the audio signals at the plurality of time-frequency points separately for each of the plurality of directions by using the weights of the plurality of time-frequency points, to obtain a weighted audio signal energy distribution of the audio signals in the plurality of directions;
an azimuth determining module, configured to obtain a sound source azimuth corresponding to the target-audio direct signal in the audio signals by using the weighted audio signal energy distribution of the audio signals in the plurality of directions; and an audio recognition module, configured to perform audio recognition to the audio signals based on the sound source azimuth corresponding to the target-audio direct signal.

An apparatus for positioning target audio by an audio interaction device according to an embodiment of this application includes: an audio obtaining module, configured to obtain audio signals collected in a plurality of directions in a space, the audio signal including a target-audio direct signal;

an echo cancellation processing module, configured to perform echo cancellation on the audio signals;

a time-frequency point calculation module, configured to obtain weights of a plurality of time-frequency points in the echo-canceled audio signals, a weight of each time-frequency point indicating a relative proportion of the target-audio direct signal in the audio signals at the time-frequency point;

a spatial spectrum weighting module, configured to weight time-frequency components of the audio signals at the plurality of time-frequency points separately for each of the plurality of directions by using the weights of the plurality of time-frequency points, to obtain a weighted audio signal energy distribution of the audio signals in the plurality of directions;

an azimuth positioning module, configured to obtain a sound source azimuth corresponding to the target-audio direct signal in the audio signals by using the weighted audio signal energy distribution of the audio signals in the plurality of directions; and a position determining module, configured to position a sound source position of the target audio in the audio interaction according to the sound source azimuth.

An audio interaction device according to an embodiment of this application includes a processor and a memory, the memory storing computer-readable instructions, the computer-readable instructions, when executed by the processor, implementing the method described above.

A computer-readable storage medium according to an embodiment of this application stores computer-readable instructions, the computer-readable instructions being executable by one or more processors for implementing the method in the embodiments.

The technical solutions provided in the embodiments of this application may include the following beneficial effects.

For given audio signals, after echo cancellation processing is performed on the audio signals, time-frequency domain expressions of the echo-canceled audio signals and weights of time-frequency points are obtained first. Then, a weighted covariance matrix corresponding to a time-frequency point is obtained based on the weights of the time-frequency points and the time-frequency domain expressions. The weighted covariance matrix is used for describing a relative proportion of a target-audio direct signal in the audio signals. Weighted calculation is performed on a spatial spectrum by using the weighted covariance matrix, to obtain a spatial spectrum of the audio signals weighted at the plurality of time-frequency points. Finally, a sound source azimuth corresponding to the target-audio direct signal in the audio signals is obtained according to the spatial spectrum. An amount of calculation is effectively controlled under the effect of the spatial spectrum, and the weighted covariance matrix corresponds to the relative proportion of the target-audio direct signal in the audio signals. Therefore, interference of interference signals on the spatial spectrum is effectively reduced, and the robustness of azimuth calculation is enhanced in complex scenarios, thereby greatly enhancing the accuracy of the azimuth, so that an azimuth can be accurately obtained for audio interaction.

It is to be understood that the foregoing general descriptions and the following detailed descriptions are only exemplary, and cannot be limited in the embodiments of this application.

BRIEF DESCRIPTION OF THE DRAWINGS

The accompanying drawings, which are incorporated herein and constitute a part of this specification, illustrate embodiments consistent with embodiments of this application and, together with the specification, serve to explain the principles of embodiments of this application.

DESCRIPTION OF EMBODIMENTS

Exemplary embodiments are described in detail herein, and examples of the exemplary embodiments are shown in the accompanying drawings. When the following descriptions are made with reference to the accompanying drawings, unless otherwise indicated, same numbers in different accompanying drawings represent same or similar elements. The implementations described in the following exemplary embodiments do not represent all implementations consistent with embodiments of this application. On the contrary, the implementations are merely examples of apparatuses and methods consistent with those are described in detail in the appended claims and some aspects of the embodiments of this application.

Figure 1:
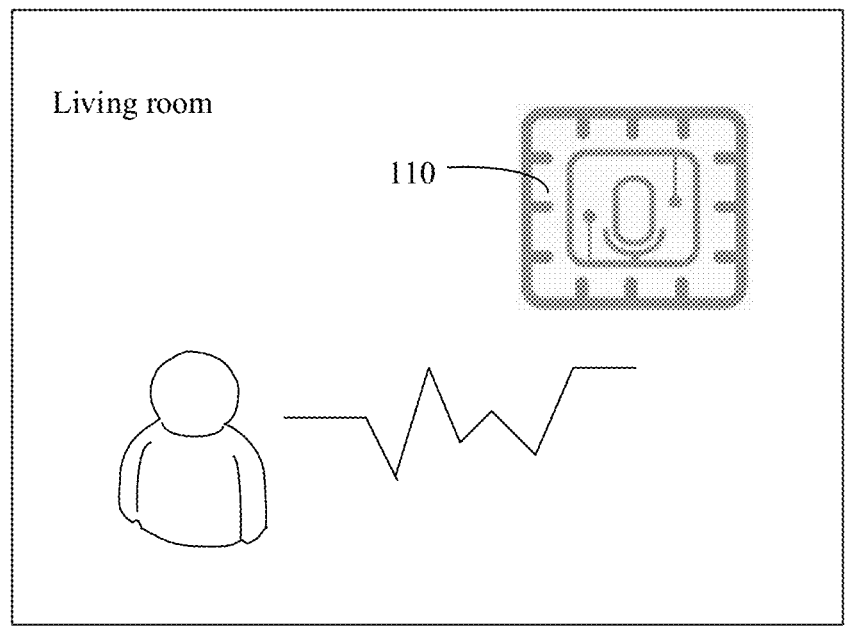
FIG. 1 is a schematic diagram of an implementation environment according to an embodiment.

FIG. 1 is a schematic diagram of an implementation environment according to an embodiment. In an exemplary embodiment, the implementation environment may be any use environment of an audio interaction device. As shown in FIG. 1, the use environment is a noisy environment in which a user in a living room using a configured audio interaction device 110 as an entrance.

In such a use environment, in addition to voice input of the user, a sound outputted by a device, such as a TV, in the living room also exists, and forms background noise with respect to the voice input of the user.

The audio interaction device 110 is equipped with a microphone array. Sampling is performed by using the microphone array, to obtain audio signals. The obtained audio signals include a target-audio direct signal, a noise signal, an echo signal, and the like. Therefore, an azimuth of target audio needs to be estimated by using the audio interaction device 110, to enhance target audio based on the azimuth, so that the audio interaction device 110 can finally obtain an audio signal emitted by the user, that is, a voice signal of the user, and transmits the signal to an audio recognition server for recognition, to provide a content service for the user.

Figure 3A:
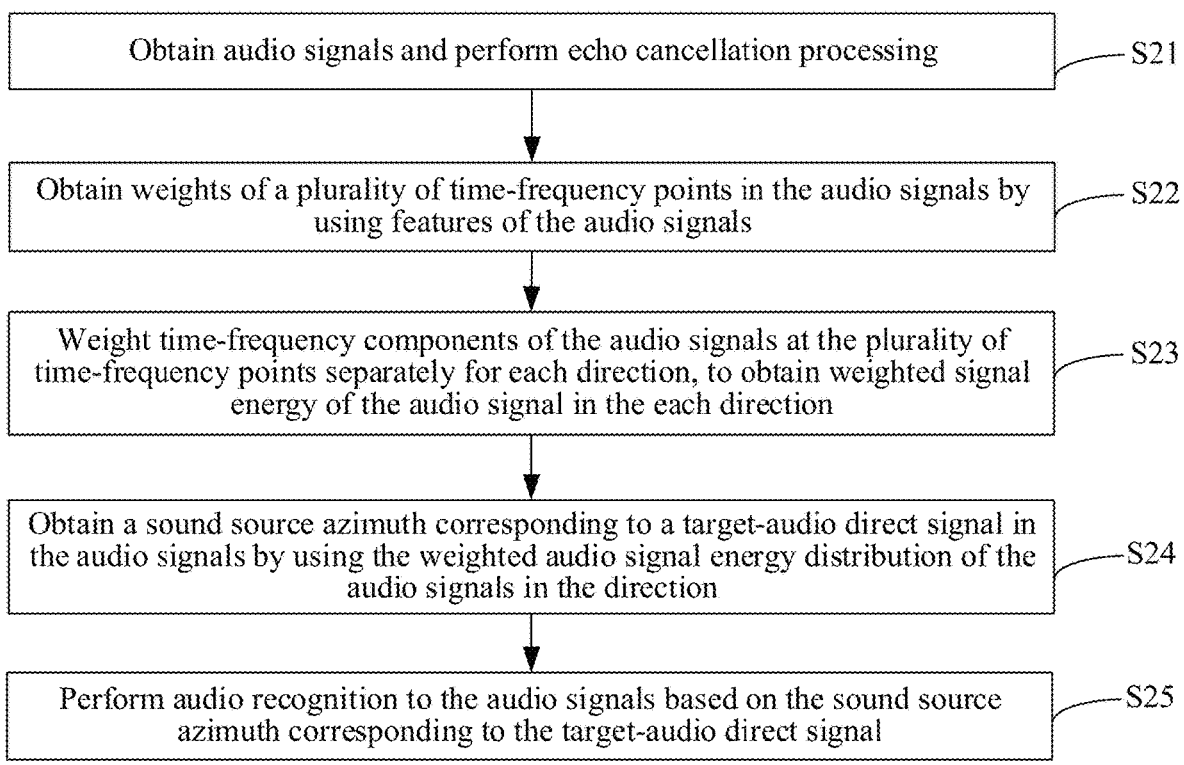
FIG. 3a is a flowchart of a sound source azimuth calculation method according to an exemplary embodiment.

In each embodiment, as shown in FIG. 3a, the audio interaction device 110 may obtain audio signals collected in a plurality of directions in a space and perform echo cancellation on the audio signals (S21). The audio signals include a target-audio direct signal. The audio interaction device 110 may obtain weights of a plurality of time-frequency points in the echo-canceled audio signals by using features of the audio signals (S22). A weight of each time-frequency point indicates a relative proportion of the target-audio direct signal in the audio signals at the time-frequency point. The audio interaction device 110 may weight time-frequency components of the audio signals at the plurality of time-frequency points separately for each of the plurality of directions by using the weights of the plurality of time-frequency points, to obtain a weighted audio signal energy distribution of the audio signals in the plurality of directions (S23). The audio interaction device 110 may obtain a sound source azimuth corresponding to the target-audio direct signal in the audio signals by using the weighted audio signal energy distribution of the audio signals in the plurality of directions (S24). The audio interaction device 110 can perform audio recognition to the audio signals by using the sound source azimuth (S25).

Speech recognition of the user can be implemented by using the audio interaction device 110, to provide corresponding content for the user based on recognized speech content. Certainly, it can be understood that in addition to performing azimuth calculation for speech recognition of the user, the azimuth calculation may be further performed on to-be-recognized audio, and the audio may be accurately recognized based on this. A voice signal or another audio signal, collectively referred to as an audio signal, may be inputted by using the audio interaction device 110 as an entrance, to be applied to different scenarios.

In a scenario in which reverberation is large, or the audio interaction device makes a sound itself to produce an echo, for example, the noisy environment described in the foregoing illustrative example, it is quite difficult to estimate an azimuth due to existence of the reverberation and/or the echo. It is likely to generate an azimuth estimation result that is completely irrelevant to or even deviates from a target direction. Under the effect of this embodiment of this application, through estimation of a weighted covariance and an effect of the weighted covariance, the robustness of azimuth calculation is enhanced, and accuracy of obtained azimuth is excellent.

Figure 2:
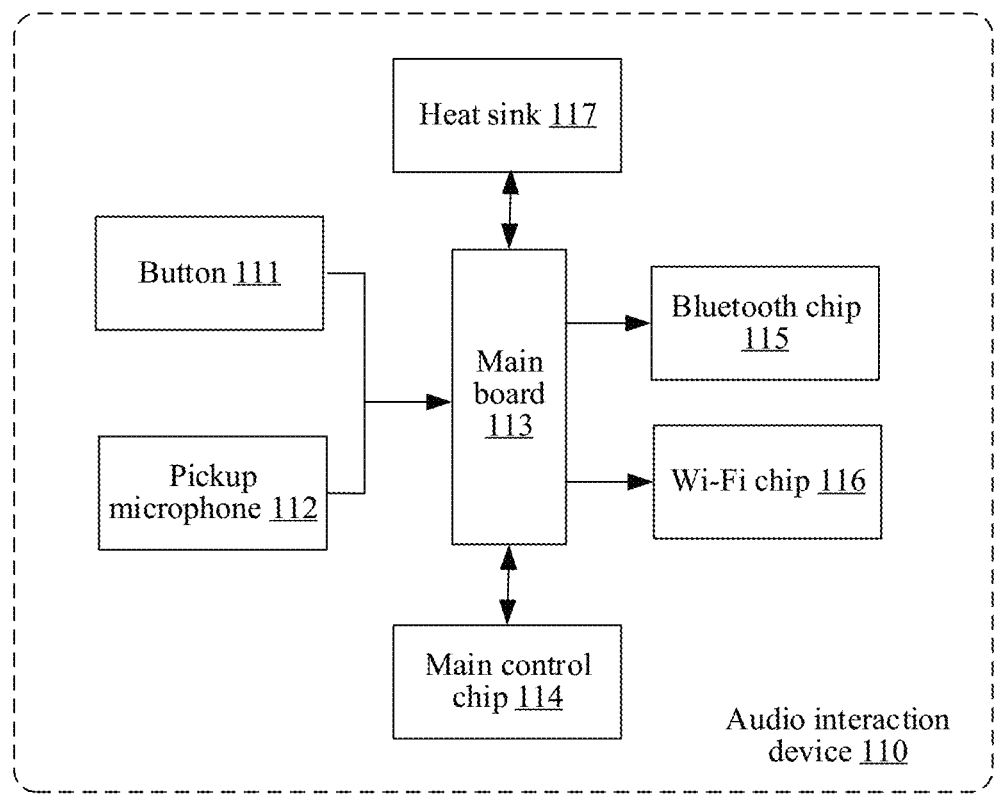
FIG. 2 is a structural block diagram of hardware of an audio interaction device according to an exemplary embodiment.

FIG. 2 is a structural block diagram of hardware of an audio interaction device according to an exemplary embodiment. The audio interaction device is merely an example adapted to the embodiments of this application, and cannot be considered as providing any limitation to a use range of the embodiments of this application. The audio interaction device cannot be interpreted as being dependent on or having to have an exemplary hardware structure shown in FIG. 2.

A hardware structure of the audio interaction device 110 may vary greatly due to differences in configuration or performance. As shown in FIG. 2, the audio interaction device 110 includes a function button 111, a pickup microphone 112, a main board 113, a main control chip 114, a Bluetooth chip 115, a Wi-Fi chip 116, and a heat sink 117.

The function button 111 is configured to configure functions in the audio interaction device 110. The user configures, through triggering of the function button 111, functions needed by the audio interaction device.

The pickup microphone 112 is formed by a plurality of microphone arrays to enhance input of the audio signal and favorably achieve long-distance pickup.

The function button 111 and the pickup microphone 112 are both connected to the main board 113 through a connection line, to be controlled by chips on the main board 113, thereby implementing the functions of the audio interaction device 110.

The chips on the main board 113 include the main control chip 114, the Bluetooth chip 115, and the Wi-Fi chip 116. It is to be understood that an operating system written into the main control chip 114 is used for implementing the functions of the audio interaction device 110. A storage medium deployed inside the main control chip is used as a carrier of resource storage.

The storage medium may be a random storage medium, a magnetic disk, an optical disc, or the like. Resources stored thereon include an operating system, an application program, data, and the like. A storage manner may be transient storage or permanent storage. The operating system is configured to manage and control hardware and application programs of the audio interaction device 110. The application program is a computer program completing at least one specific task based on the operating system, and implements the method included in this embodiment of this application through the execution of a series of operation instructions. The data may be photos, pictures, and the like stored in the magnetic disk.

As described above in detail, the audio interaction device 110 applicable to this embodiment of this application determines an azimuth of the target audio in a form of reading, by using the main control chip 114, the series of operation instructions stored in the storage medium.

FIG. 3 is a flowchart of a sound source azimuth calculation method according to an exemplary embodiment. In an exemplary embodiment, as shown in FIG. 3, the sound source azimuth calculation method includes at least the following steps.

Step 310: Obtain audio signals.

The audio signals are obtained though sampling by the audio interaction device. In an exemplary embodiment, during audio interaction, a target-audio direct signal formed by voice input of a user, that is, target audio, together with a noise signal and an echo signal, forms the audio signals obtained through sampling by the audio interaction device. The audio signals are audio signals in a plurality of directions in a space obtained through sampling by using the microphone arrays by the audio interaction device for obtaining the target-audio direct signal. The target-audio direct signal provides speech content for speech recognition that needs to be performed in voice interaction.

The audio signals include voice signals inputted by the user, and may further include other audio signals applicable to different scenarios. In another exemplary embodiment, the audio signal is generated from another audio resource, such as an audio resource associated with the audio interaction device, instead of being generated from the voice input of the user. However, regardless of a scenario to which the audio signals are applied to, the audio signals are all obtained by the audio interaction device through sampling.

Step 330: Perform echo cancellation on the audio signals.

Audio processing is performed on all audio signals sampled by the audio interaction device. The audio processing includes executing a series of processes such as echo reference signal extraction, echo cancellation, and time-frequency domain analysis.

The executed echo reference signal extraction and echo cancellation processes, that is, echo cancellation processing performed on the audio signal, are performed to obtain echo-canceled audio signals.

Step 350: Obtain time-frequency domain expressions of the echo-canceled audio signals and weights of time-frequency points.

As described above, audio processing is performed on audio signals sampled by the audio interaction device. That is, a series of processes, such as echo reference signal extraction, echo cancellation, and time-frequency domain analysis, are executed, to obtain the time-frequency domain expressions of the echo-canceled audio signals.

The time-frequency domain expression referred to herein is an audio signal expression corresponding to a time-frequency point obtained through time-frequency domain analysis after the echo cancellation processing is performed on the audio signal, of. It is to be understood that an audio signal expressed in frames in the time-frequency domain is expressed from two aspects, namely, a time domain and a frequency domain, this is, the obtained time-frequency domain expression. Each time-frequency domain expression corresponds to a time-frequency point that uniquely exists.

The time-frequency domain expression of the audio signal is used for describing the signal in the time-frequency domain. A weight of each time-frequency point is obtained based on the time-frequency domain expression of the audio signal corresponding to the time-frequency point. The weight of the time-frequency point is used for describing the relative proportion of the target-audio direct signal at the time-frequency point. A larger relative proportion of the target-audio direct signal in the audio signals at the time-frequency point indicates a larger weight. Conversely, a smaller relative proportion of the target-audio direct signal in the audio signals indicates a smaller weight.

The weight of the time-frequency point is calculated from information that exists at the time-frequency point after the echo cancellation on the audio signals and that is related to the target audio. Therefore, a weight describing a proportion of target audio at each time-frequency point can be obtained through estimation.

It is to be understood that the weights obtained through time-frequency point calculation may be calculated from specific one-dimensional information related to the target audio. That is, a single weight is obtained by calculating the time-frequency point. The single weight is used as the weight of the audio signal at the time-frequency point. In addition, a plurality of weights of the time-frequency point may also be calculated from multi-dimensional information related to the target audio. In this case, the weight of the audio signal at the time-frequency point is obtained based on the plurality of weights.

For example, the information related to the target audio is an audio feature parameter. The audio feature parameter may be a signal-to-noise ratio (SNR) estimate of the time-frequency domain expression at the time-frequency point. Based on this, the audio feature parameter further includes one or any combination of audio feature parameters including a direct-to-reverb ratio (DRR) and a residual echo signal estimate of the time-frequency domain expression at the time-frequency point and a probability that the time-frequency point corresponds to a target wakeup word.

To weight, for an audio signal in each direction in the plurality of directions, time-frequency components of the audio signal at the plurality of time-frequency points separately by using the weights of the plurality of time-frequency points, to obtain weighted signal energy of the audio signal in the each direction, in step 370, a weighted covariance matrix corresponding to the time-frequency points may be obtained based on the weights of the time-frequency points and the time-frequency domain expressions, the weighted covariance matrix being used for describing the relative proportion of the target-audio direct signal in the audio signals.

The weights of the audio signals at the time-frequency points are obtained by performing step 350. Therefore, the weighted covariance matrix is estimated based on the obtained weights and the time-frequency domain expressions of the echo-canceled audio signals.

The weighted covariance matrix obtained through estimation is related to the time-frequency domain expressions of the audio signals. The weighted covariance matrix is obtained by performing weighted calculation on the weights and the time-frequency domain expressions of the audio signals at each time-frequency point.

A value corresponding to a weighted element in the weighted covariance matrix is used for representing a relative proportion of a target-audio direct signal at a corresponding time-frequency point.

The time-frequency domain expressions of the echo-canceled audio signals are accurate descriptions of the audio signals in a time-frequency domain for the target-audio direct signal. Weights of the time-frequency points are also obtained by estimating the target audio based on the time-frequency domain expressions of the echo-canceled audio signals. Therefore, the time-frequency domain expressions and the weights are both used for representing existence of the target-audio direct signal in the audio signals. The weighted covariance matrix is constructed by synthesizing the time-frequency domain expressions and the weights, so that subsequent spatial spectrum calculation can be performed for each time-frequency point.

In step 380: Perform weighted calculation on a spatial spectrum of the audio signals by using the weighted covariance matrix, to obtain a spatial spectrum of the audio signals weighted at the plurality of time-frequency points, that is, the weighted signal energy distribution of the audio signals in the plurality of directions.

The weighted covariance matrix is introduced to the calculation on the spatial spectrum of the audio signals. Weighted calculation, corresponding to each frame, for a spatial spectrum of each frequency point is performed based on the time-frequency domain expressions of the echo-canceled audio signals, to obtain a spatial spectrum of the audio signals weighted at the plurality of time-frequency points. In this way, interference of a noise and a residual echo to the spatial spectrum calculation is reduced. While controlling an amount of calculation, the robustness is improved.

In an exemplary embodiment, an unweighted spatial spectrum is calculated by using the following formula, that is:

$$p(\theta)\Sigma_{n=n_0}^{n_1}\Sigma_{f=f_0}^{f_1}\|w(\theta,f)^H S(n,f)\|^2 \qquad (1)$$

A target wakeup word (that is, a preset keyword, where audio recognition is started only after the device spots the keyword) is within a time period from a frame $n_0$ to a frame $n_1$. That is, n is a frame number, f is a frequency point number, f=1, 2, ..., $N_f$, $N_f$ is a quantity of frequency points, $f_0$ and $f_1$ are selected and are used for estimating a frequency range of the spatial spectrum, "$\cdot^H$" represents a Hermitian operator, $w(\theta,f)$ is pre-designed spatial filter coefficient pointing to a direction $\theta$ at the frequency point f, $w(\theta,f) \in C^{N \times 1}$ (a complex vector of N×1), and $S(n,f)$ is a time-frequency component of a frame n at the frequency point f obtained after time-frequency analysis is performed on the audio signals.

It is to be understood that $w(\theta, f)$ may be designed by using a fixed beamforming algorithm or an adaptive beamforming algorithm. A design objective/effect of $w(\theta, f)$ is to retain a signal in the direction $\theta$, and suppress signals in other directions to a maximum extent.

Based on this, a weighted spatial spectrum $p_g(\theta_i)$ is calculated. That is, a weighted covariance matrix is introduced to spatial spectrum weighting, and is implemented by using the following formula:

$$p_g(\theta_i)\Sigma_{n=n_0}^{n_1}\Sigma_{f=f_0}^{f_1}g(n,f)\|w(\theta_i,f)^H S(n,f)\|^2, i=1,2,\ldots,N_\theta \qquad (3)$$

where g(n,f) is a weight at each time-frequency point, $\theta_i$ is the $i^{th}$ direction, and $N_\theta$ is a total quantity of directions.

In this case, if is defined that $C(n,f)=S(n,f)S^H(n,f)$, the formula (3) is simplified as:

$$p_g(\theta_i) = \sum_{f=f_0}^{f_1} w(\theta_i, f)^H \left\{ \sum_{n=n_0}^{n_1} g(n, f)C(n, f) \right\} w(\theta_i, f)$$

If a weighted covariance matrix $G(n_0, n_1, f)$ is defined as:

$$G(n_0, n_1, f) = \sum_{n=n_0}^{n_1} g(n, f)C(n, f) = \sum_{n=n_0}^{n_1} g(n, f)S(n, f)S^H(n, f)$$

the formula (3) may be further simplified and expressed as:

$$p_g(\theta_i)=\Sigma_{f=f_0}^{f_1} w(\theta_i,f)^H G(n_0,n_1,f)w(\theta_i,f) \qquad (4)$$

At this point, the weighted spatial spectrum is obtained by using the formula (4).

Step 390: Obtain a sound source azimuth corresponding to the target-audio direct signal in the audio signals according to the spatial spectrum of the audio signals.

After the spatial spectrum is estimated through the foregoing steps, because the spatial spectrum corresponds to a direction, an azimuth may be selected according to the spatial spectrum, to learn of a direction of an azimuth of a target-audio direct signal located in a microphone array, that is, the sound source azimuth in the audio interaction.

The spatial spectrum estimation is performed by introducing the weighted covariance matrix, and a weight element in the weighted covariance matrix represents interference of a noise signal and a residual echo signal to the target-audio direct signal. Therefore, interference of the noise signal and the residual echo signal to the spatial spectrum estimation is shielded under the effect of the weighted covariance matrix.

For example, when an audio interaction device, such as a smart speaker, generates a sound, although most of echo signals are removed from audio signals through an echo cancellation process, in the obtained time-frequency domain expressions, if energy of the residual echo signal may be still greater than the energy of the target-audio direct signal, especially when a user is relatively far away from the audio interaction device, or when a speaking volume is relatively low, relatively strong interference generated by the residual echo signal to the spatial spectrum estimation is shielded under the effect of the weighted covariance matrix, to prevent an azimuth obtained through estimation from deviating toward a direction of a speaker of the audio interaction device or a direction of a strong reflection source in an adjacent region.

For selection of an azimuth according to the spatial spectrum, in an exemplary embodiment, an angle corresponding to a peak point of the spatial spectrum is used as the sound source azimuth based on a relationship between the spatial spectrum and the angle.

Figure 4:
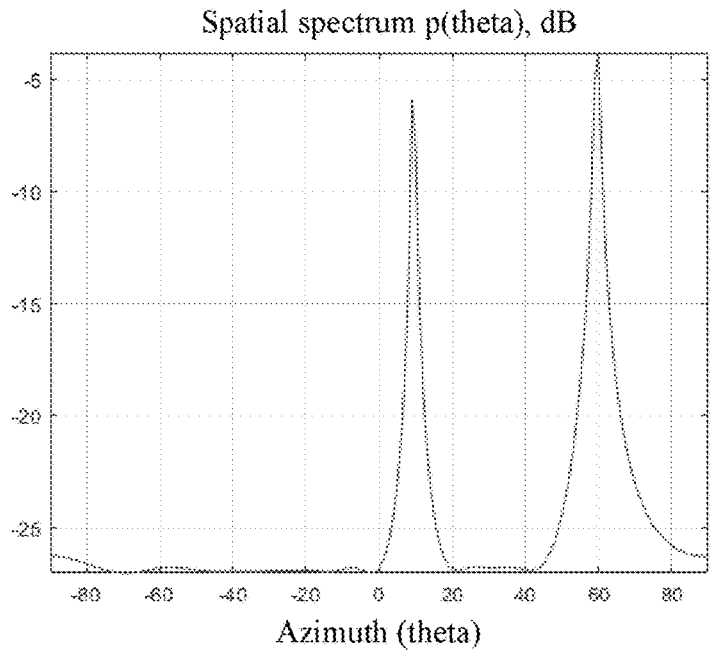
FIG. 4 is a schematic diagram of a relationship between a spatial spectrum and an angle according to an exemplary embodiment.

For example, the relationship between the spatial spectrum and the angle is shown in FIG. 4. FIG. 4 is a schematic diagram of a relationship between a spatial spectrum and an angle according to an exemplary embodiment. After the spatial spectrum $p(\theta_i)$ is obtained through calculation in the foregoing step, a peak point shown in FIG. 4, that is, a 60-degree direction in FIG. 2, is used as the sound source azimuth.

Certainly, it is to be understood that this is only one exemplary manner of obtaining a sound source azimuth, but is not limited thereto. The sound source azimuth may alternatively be obtained through selection based on the spatial spectrum by using another method. Regardless of the selection method, the sound source azimuth is accurately obtained under the effect of the spatial spectrum having robustness in a complex environment.

For example, if the environment is complex, and there is strong reverberation or a strong reflection source, the spatial spectrum calculated generates a relatively high energy peak in a direction of the reverberation or a direction of the reflection source consequently, and correspondingly, an energy peak of the target-audio direct signal may become weak with respect to another direction consequently, which are both caused by weak robustness of spatial spectrum estimation under impact of a complex environment.

However, by performing the foregoing step, that is, the robustness of the spatial spectrum is greatly increased through estimation and intervention of the weighted covariance matrix. Therefore, the sound source azimuth can also be accurately obtained without changing the manner of obtaining the sound source azimuth based on the spatial spectrum, and an amount of calculation is also controlled because of the application of the spatial spectrum.

Figure 3B:
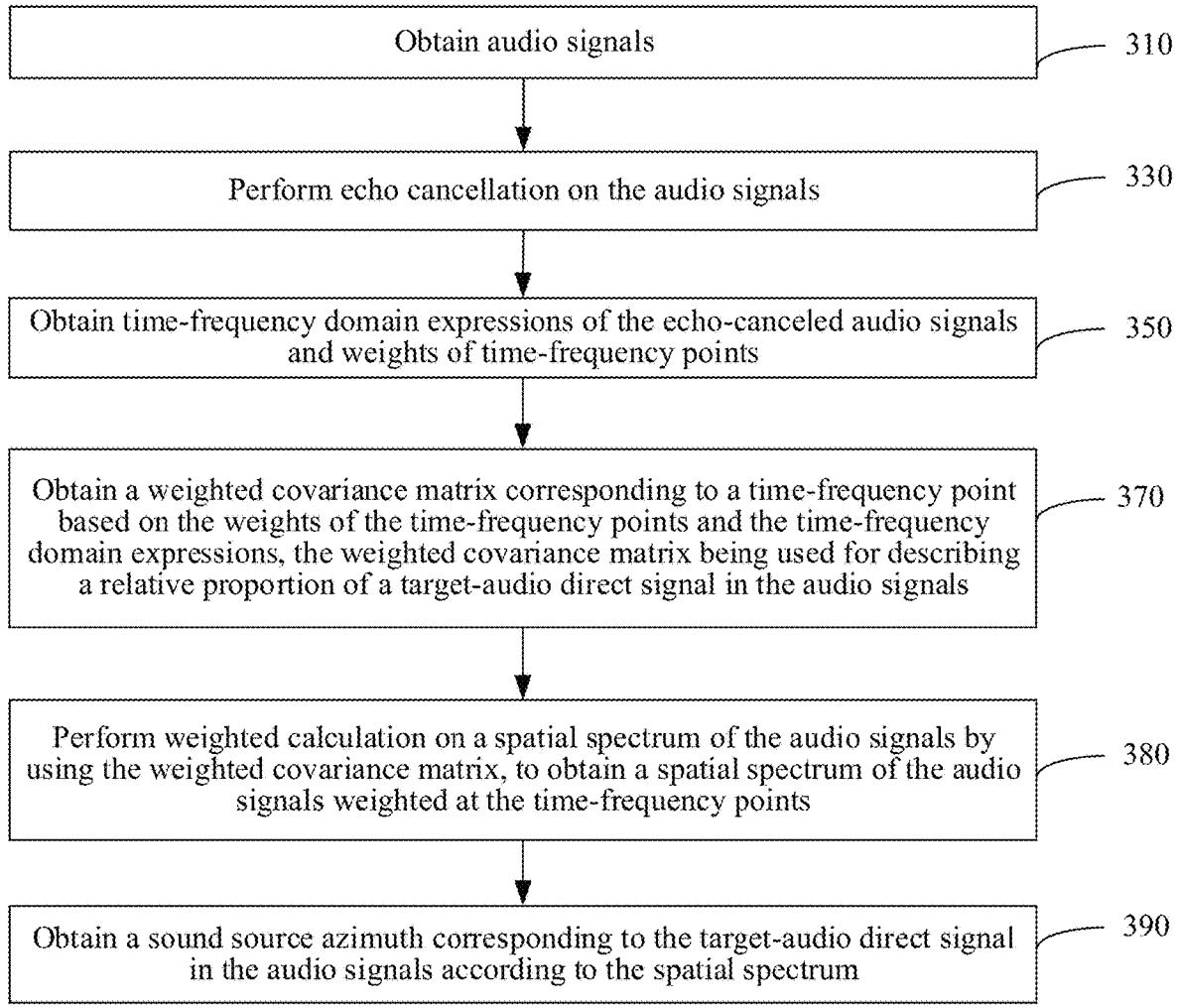
FIG. 3b is a flowchart of a sound source azimuth calculation method according to an exemplary embodiment.
Figure 5:
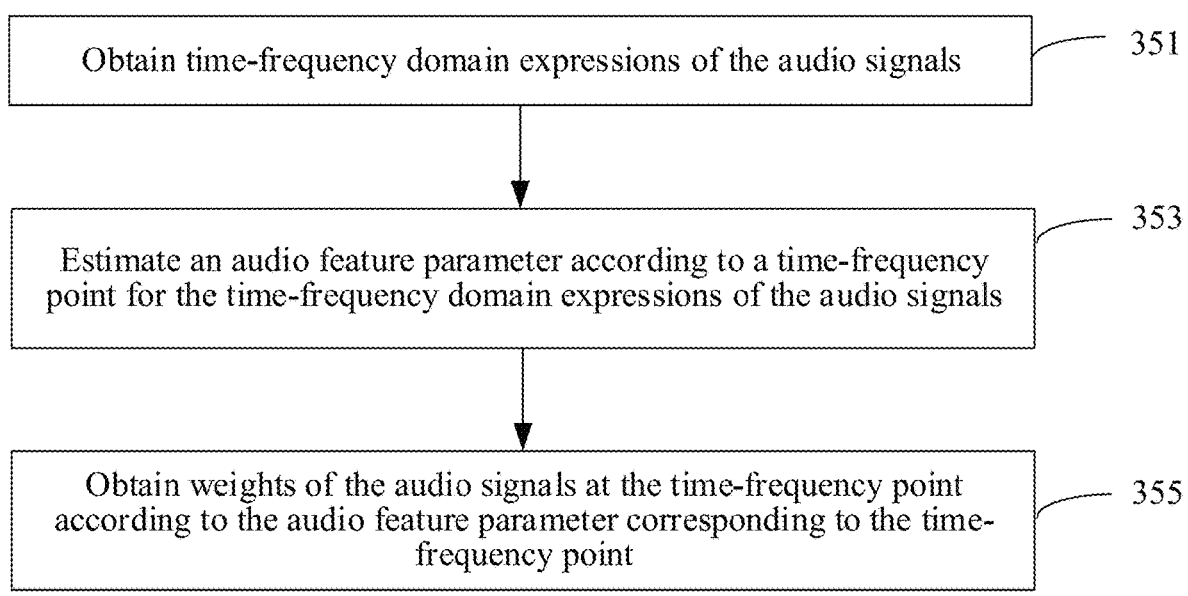
FIG. 5 is a flowchart of describing step 350 according to the embodiment corresponding to FIG. 3b.

FIG. 5 is a flowchart of describing step 350 according to the embodiment corresponding to FIG. 3b. In an exemplary embodiment, step 350 includes the following steps:

Step 351: Obtain time-frequency domain expressions of the audio signals.

Step 353: Estimate an audio feature parameter according to the time-frequency point for the time-frequency domain expressions of the audio signals.

Step 355: Obtain weights of the audio signals at each time-frequency point according to the audio feature parameter corresponding to the time-frequency point.

As described above, the time-frequency domain expression of the audio signal is a signal expression of the echo-canceled audio signal at the time-frequency point. In other words, each time-frequency point has a corresponding time-frequency domain expression of an audio signal. The audio feature parameter is used for describing an existence situation of the target audio and existence situations of noise and a residual echo after the echo cancellation on the audio signals.

In an exemplary embodiment, the audio feature parameter is at least an SNR estimate of the time-frequency domain expressions at the time-frequency point. In addition, the audio feature parameter may further include other types of feature parameter such as a DRR and a residual echo signal estimate (signal-to-echo ratio, SER for short) of the time-frequency domain expression at the time-frequency point and a probability that the time-frequency point corresponds to a target wakeup word.

It is to be understood that weights of the audio signals at the time-frequency point under a dimension of a single-type audio feature parameter are obtained according to the single-type audio feature parameter. In other words, if an estimated audio feature parameter is single when the audio signals are at a time-frequency point, a single weight is obtained at the time-frequency point, and the weight is used as the weight of the audio signals at the time-frequency point.

Correspondingly, weights corresponding to a plurality of types of audio feature parameters are obtained at the time-frequency point according to the audio feature parameters, and all the weights obtained at the time-frequency point are synthesized and used as the weights of the audio signals at the time-frequency point.

Further, for different types of audio feature parameters, estimation of the audio feature parameters is described.

(1) An SNR estimate of the time-frequency domain expressions at the time-frequency point is an SNR, obtained through estimation, of the time-frequency point at which the time-frequency domain expressions are located.

In an exemplary embodiment, the SNR may be calculated by using the following formula, that is:

$$SNR(n, f) = \frac{\|S_1(n, f)\|^2 - \|k(n, f)\|^2}{\|k(n, f)\|^2}$$

where k(n,f) is a noise estimate signal at a time-frequency point (n,f), and $S_1$ (n,f) is a time-frequency domain expression of an echo-canceled voice signal at the time-frequency point (n,f). The noise estimate signal k(n,f) is obtained through minimum tracking that is performed.

(2) The DRR of the time-frequency domain expression at the time-frequency point is a ratio of energy of the target-audio direct signal to energy of a reverberation signal for the time-frequency domain expression at the time-frequency point.

In an exemplary embodiment, the DRR may be obtained through estimation by using a simple calculation method shown below, that is:

$$DRR(n, f) = \frac{(2B_f + 1)B_n \|S_1(n, f)\|^2}{\sum_{i=n-B_n}^{n-1} \sum_{j=f-B_f}^{f+B_f} \|S_1(i, j)\|^2}$$

where $B_n > 0$ represents a reverberation time length in a room (or a preset fixed time length); $B_f > 0$ is an inter-frequency leakage width of a time-frequency analysis algorithm used by a system, for example, a frequency resolution determined according to a length of time-frequency analysis (FFT) and a time analysis window function used.

(3) For the residual echo signal estimate, a residual echo signal estimate in the time-frequency domain expression is estimated. The residual echo signal estimate is obtained through echo-cancellation-post-processing (EC-PP) estimation.

In an exemplary embodiment, a residual echo signal ê(n,f) in the time-frequency domain expression is estimated first, and then a residual echo signal estimate is calculated by using the following formula, that is:

$$SER(n, f) = \frac{\|S_1(n, f)\|^2 - \|e(n, f)\|^2}{\|ê(n, f)\|^2}$$

(4) The probability that the time-frequency point corresponds to the target wakeup word is a probability that the time-frequency point belongs to the target wakeup word. It is assumed that in a pre-processing process of a microphone array, a keyword is spotted, to spot whether a preset keyword, that is, a target wakeup word, appears in the audio signals.

In an exemplary embodiment, when a keyword is spotted, starting and ending time points of appearance of each phoneme in the keyword, that is, the target wakeup word, are obtained, and even a time-frequency point at which the target wakeup word is located is obtained.

Therefore, a probability that each time-frequency point belongs to a target wakeup word may be obtained, that is, the probability that the time-frequency point corresponds to the target wakeup word is obtained, so that time-frequency points corresponding to some non-target wakeup words can be excluded from calculation of the spatial spectrum estimation, to further improve the robustness of the spatial spectrum estimation against noise, especially non-steady noise.

In summary, after the audio feature parameter corresponding to the time-frequency point is obtained through estimation, weights of audio signals at the time-frequency point obtained through mapping according to the audio feature parameter corresponding to the time-frequency point are obtained.

Because the audio feature parameter is directed to the target-audio direct signal, a value of the audio feature parameter is positively correlated with the target-audio direct signal, and is negatively correlated with a noise signal and an echo signal. The audio feature parameter corresponds to energy strength of the target-audio direct signal at the time-frequency point. Therefore, there is a positive mapping relationship between the audio feature parameter and the weight.

In an exemplary embodiment, by using a mapping function, a weight of a corresponding time-frequency point is obtained according to the audio feature parameter obtained through the estimation.

Figure 6:
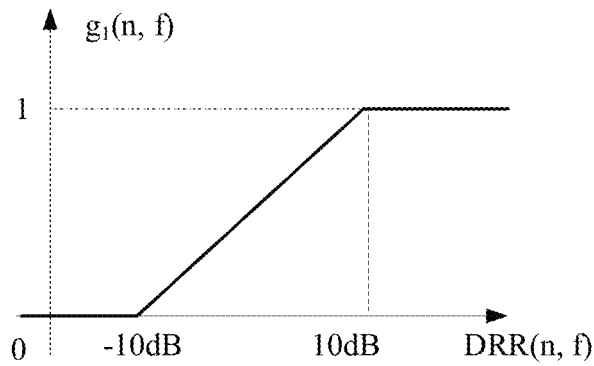
FIG. 6 is a schematic diagram of a possible mapping relationship from a DRR to a weight according to an exemplary embodiment.

As described in FIG. 6, FIG. 6 is a schematic diagram of a possible mapping relationship from a DRR (n,f) to a weight $g_1(n,f)$ according to an exemplary embodiment. The weight $g_1(n,f)$ can be obtained based on the DRR estimate by using the mapping function shown in FIG. 6. It is to be also understood that a function curve and positions of two inflection points used in FIG. 6 are all examples.

In this exemplary embodiment, the audio feature parameter describing the target audio is obtained based on the time-frequency domain expressions of the audio signals, thereby excluding weights of a noise signal and a residual echo signal, to ensure that subsequent spatial spectrum calculation is not interfered with.

In an exemplary embodiment, there may be a single type of audio feature parameter, that is, the SNR estimate of the time-frequency domain expressions at the time-frequency point. Step 353 includes: estimating an SNR estimate of each time-frequency point for the time-frequency domain expressions of the audio signals, the SNR estimate being used for obtaining the weights of the audio signals at the time-frequency point through mapping.

The SNR estimate of the time-frequency domain expressions at the time-frequency point is indispensable for the audio feature parameter. If the type of the audio feature parameter is undiversified, the audio feature parameter is the SNR estimate of the time-frequency domain expressions at the time-frequency point. If the audio feature parameter includes a plurality of types of feature parameters, other types of feature parameters are added and enriched based on the SNR estimate of the time-frequency domain expressions at the time-frequency point.

Figure 7:
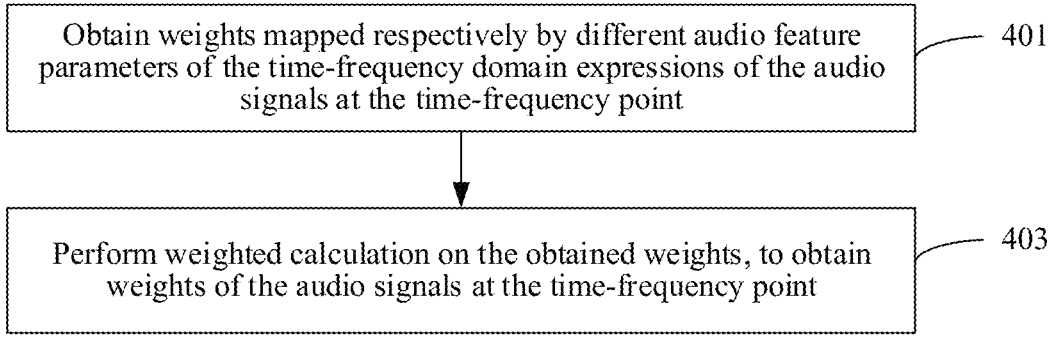
FIG. 7 is a flowchart of describing step 355 according to the embodiment corresponding to FIG. 5.

FIG. 7 is a flowchart of describing step 355 according to the embodiment corresponding to FIG. 5. In an exemplary embodiment, there are a plurality of types of audio feature parameters. Step 355 includes at least the following steps:

Step 401: Obtain weights mapped respectively by different audio feature parameters of the time-frequency domain expressions of the audio signals at the time-frequency point.

In step 403: Perform weighted calculation on the obtained weights, to obtain weights of the audio signals at the time-frequency point.

As described above, there may be a plurality of types of audio feature parameters of the time-frequency domain expressions at the time-frequency point, so that corresponding weights are obtained under different dimensions through mapping.

The weighted calculation is performed on the plurality of weights obtained through mapping, to synthesize the plurality of weights to obtain weights of the audio signals at the time-frequency point.

In an exemplary embodiment, the audio feature parameter includes the probability that the time-frequency point corresponds to the target wakeup word. In this case, step 353 includes:

spotting a target wakeup word in the audio signals, and estimating a time-frequency point at which the spotted target wakeup word is located, to obtain a probability that each time-frequency point corresponds to the target wakeup word.

A time-frequency point at which the spotted target wakeup word is located is estimated through keyword-spotting (KWS), to obtain a probability that each time-frequency point corresponds to the target wakeup word.

In an exemplary embodiment, step 370 includes: performing weighted calculation on the time-frequency domain expressions and the weights of the audio signals at the time-frequency point, to obtain weighted element values corresponding to the time-frequency point in the weighted covariance matrix, the weighted element values corresponding to the time-frequency point forming the weighted covariance matrix.

By performing the foregoing step, after the time-frequency domain expressions and the weights of the audio signals at the time-frequency point, weighted element values of the time-frequency point in the weighted covariance matrix may be calculated.

Specifically, the weighted element values are obtained through weighted calculation between the time-frequency domain expressions and the weights. As described in the following formula, a weighted covariance matrix $G(n_0, n_1, f)$ is:

$$G(n_0, n_1, f) = \sum_{n=n_0}^{n_1} g(n, f)C(n, f) = \sum_{n=n_0}^{n_1} g(n, f)S(n, f)S^H(n, f)$$

Figure 8:
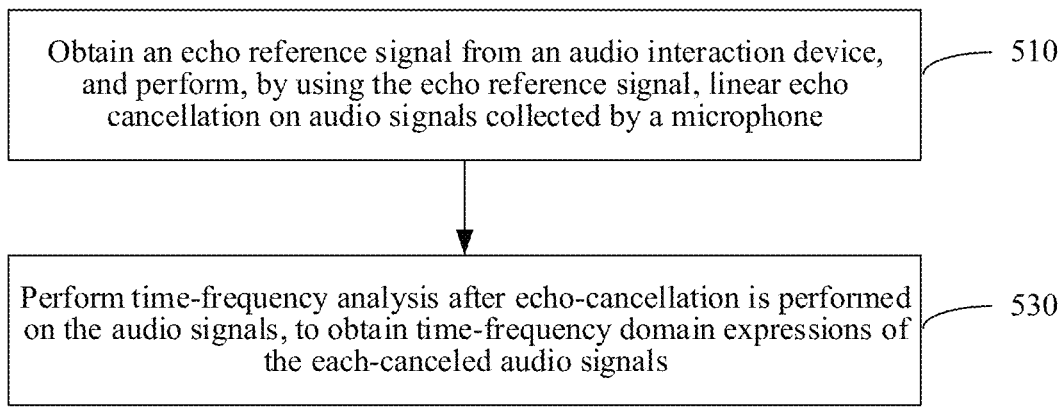
FIG. 8 is a flowchart of a sound source azimuth calculation method according to another exemplary embodiment.

FIG. 8 is a flowchart of a sound source azimuth calculation method according to another exemplary embodiment. In another exemplary embodiment, the sound source azimuth calculation method is shown in FIG. 8. Step 330 includes at least the following steps:

Step 510: Obtain an echo reference signal from an audio interaction device, and perform, by using the echo reference signal, linear echo cancellation on the audio signals, which may be collected by a microphone array.

Step 530: Perform time-frequency analysis on the echo-canceled audio signals, to obtain time-frequency domain expressions of the echo-canceled audio signals.

The audio interaction device, as an interface of services related to audio, is configured to implement audio interaction for a user. The audio interaction device may be a product such as a smart speaker, a smart TV with a voice control function, or a set top box. A microphone of the audio interaction device is in an array form, that is, a microphone array.

The audio interaction device in a working state samples signals, to obtain audio signals existing in an environment in which the audio interaction device is located. It is to be understood that in voice interaction, the obtained audio signals include a target-audio direct signal, a noise signal, and an echo signal.

The time-frequency analysis referred to in an exemplary embodiment may be signal time-frequency analysis implemented through short-time Fourier transform.

In the microphone array, after echo cancellation is performed, by using an echo reference signal, on audio signals obtained by each microphone through sampling, a time-frequency domain expression of each audio signal at each time-frequency point is obtained. Only in this way can a weighted covariance matrix may be introduced to spatial spectrum estimation, to obtain a spatial spectrum through which a sound source azimuth can be determined.

In the exemplary embodiment, pre-processing is implemented on the audio signals in the audio interaction device, so that based on this, a weighted covariance matrix and a corresponding spatial spectrum can be estimated.

Figure 9:
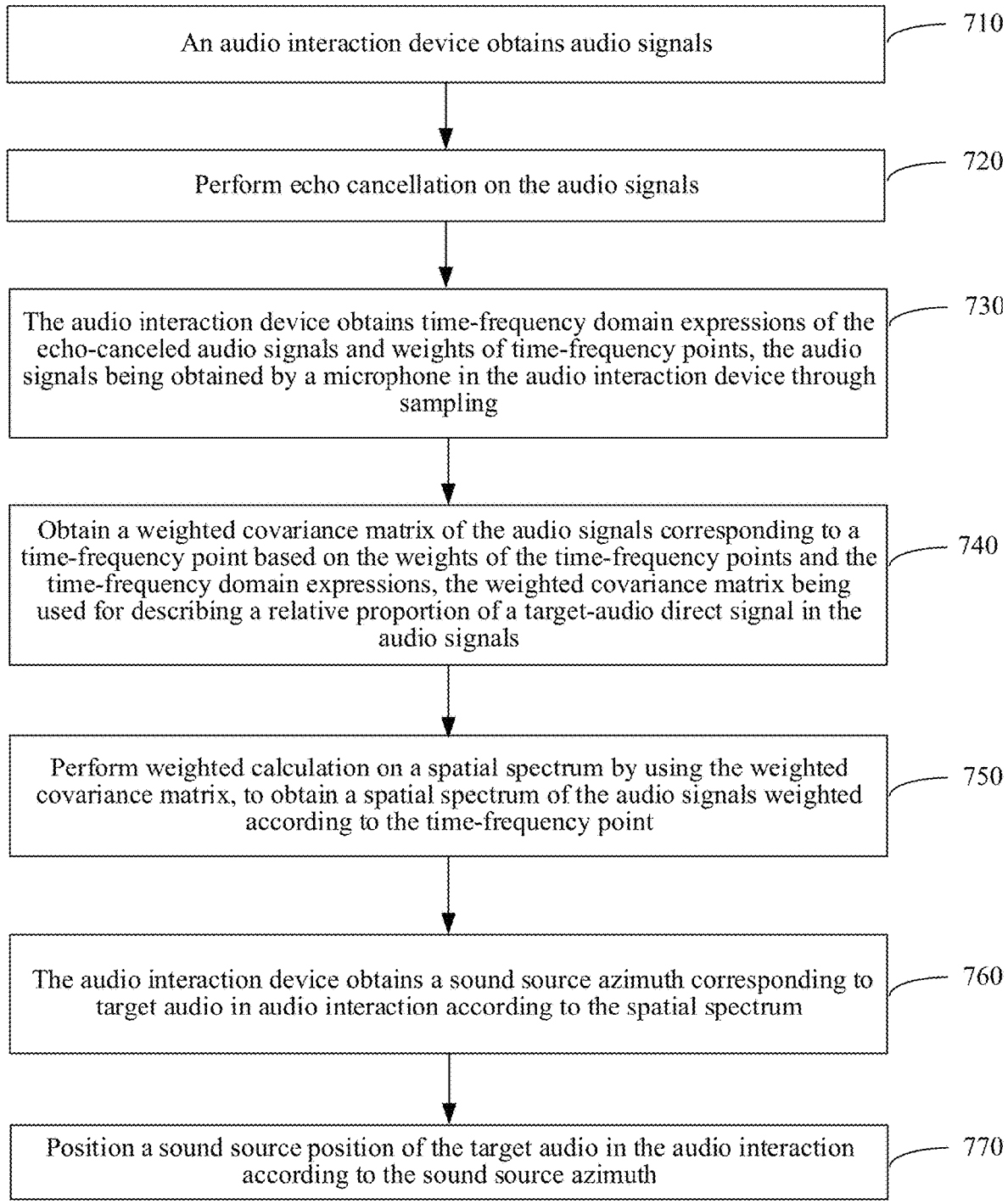
FIG. 9 is a flowchart of a method for positioning target audio by an audio interaction device according to an exemplary embodiment.

FIG. 9 is a flowchart of a method for positioning target audio by an audio interaction device according to an exemplary embodiment. In an exemplary embodiment, as shown in FIG. 9, the method for positioning target audio by an audio interaction device includes at least the following steps.

Step 710: An audio interaction device obtains audio signals.

Step 720: Perform echo cancellation on the audio signals.

Step 730: The audio interaction device obtains time-frequency domain expressions of echo-canceled audio signal and weights of time-frequency points, the audio signals being obtained by a microphone in the audio interaction device through sampling.

Step 740: Obtain a weighted covariance matrix of the audio signals corresponding to the time-frequency point based on the weights of the time-frequency points and the time-frequency domain expressions, the weighted covariance matrix being used for describing a relative proportion of a target-audio direct signal in the audio signals.

Step 750: Perform weighted calculation on a spatial spectrum of the audio signal by using the weighted covariance matrix, to obtain a spatial spectrum of the audio signals weighted at the plurality of time-frequency points.

Step 760: The audio interaction device obtains a sound source azimuth corresponding to target audio in audio interaction according to the spatial spectrum of the audio signals.

Step 770: Position a sound source position of the target audio in the audio interaction according to the sound source azimuth.

In this exemplary embodiment, sound source positioning of the target audio is implemented, to learn of a position of a corresponding sound source of the target audio.

In the foregoing exemplary embodiment, in a case that an amount of calculation is controlled, spatial spectrum estimation having robustness enhanced is implemented, and interference of interference signals, such as an echo signal and a residual echo signal, to the spatial spectrum estimation is efficiently reduced, thereby improving the robustness of the azimuth estimation.

Therefore, the accuracy and the robustness of the azimuth estimation can be improved in a scenario including reverberation, an echo, and noise, to correspondingly improve and upgrade the audio recognition performance in the audio interaction device.

With reference to the implementation of the foregoing method, description is made by using an example in which the azimuth estimation in the audio interaction device is implemented.

The existing azimuth estimations, on the one hand, may be implemented by using a classic spatial spectrum estimation algorithm, an azimuth being estimated by using energy of signals from respective directions in a space, and on the other hand, may be implemented by using a spatial spectrum estimation algorithm with a linear de-reverberation capability.

In the classic spatial spectrum estimation algorithm, a spatial spectrum estimation result is obtained by using the time-frequency domain expressions of the audio signals.

However, if there is strong reverberation or a strong reflection source in an environment, an estimated spatial spectrum may generate a relatively high energy peak in a direction of the reverberation or reflection source, and an energy peak of the target audio may also be weakened with respect to another direction, resulting in that the azimuth cannot be accurately estimated.

In another example, through the performed pre-processing of the audio signals, most echo signals are removed from the audio signals. However, energy of a residual echo signal in the time-frequency domain expressions of the audio signals may still be greater than energy of a target audio signal. Especially, when a user is relatively far away from the audio interaction device, or when a speaking volume is relatively low, the residual echo signal generates relatively strong interference to the estimated spatial spectrum. Consequently, the azimuth deviates toward a direction of a speaker of the audio interaction device, or a direction of a strong reflection source.

Therefore, the classic spatial spectrum estimation algorithm lacks robustness, resulting in inaccuracy of azimuth estimation.

In the spatial spectrum estimation algorithm with a linear de-reverberation capability, reverberation components in audio signals are reduced by using a linear processing algorithm, and direct components of pieces of target audio in a space are retained, to reduce impact of the reverberation on the spatial spectrum estimation.

However, such a linear de-reverberation algorithm is an adaptive algorithm. When noise or an echo still exists in an environment, the performance of the de-reverberation is degraded significantly, and non-convergence, even divergence, is likely to appear. Next, the linear de-reverberation algorithm cannot improve the robustness of the spatial spectrum estimation in a scenario including noise and an echo, and has a quite large amount of calculation, and it is difficult to deploy the linear de-reverberation algorithm on the audio interaction device.

Therefore, none of the existing azimuth estimations are applicable to the audio interaction device. While controlling the amount of the calculation by using the method according to the exemplary embodiments of this application, the robustness of the spatial spectrum estimation against reverberation, noise, and a speaker echo needs to be improved.

Figure 10:
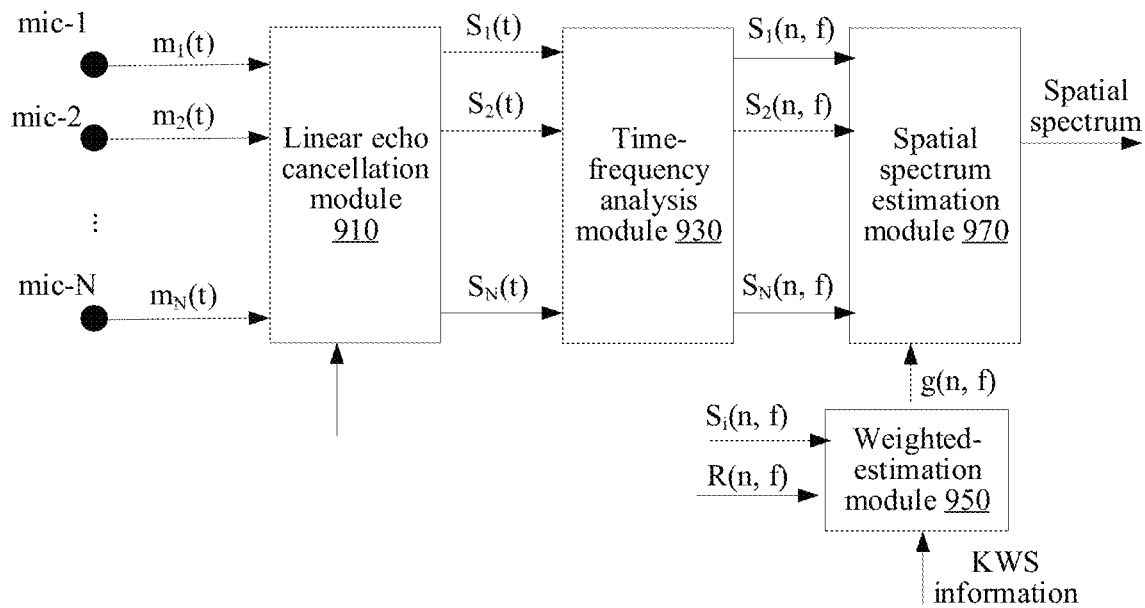
FIG. 10 is a diagram of a system architecture of determining an azimuth by an audio interaction device according to an exemplary embodiment of this application.

FIG. 10 is a diagram of a system architecture of determining an azimuth by an audio interaction device according to an exemplary embodiment of this application. Azimuth estimation performed by the audio interaction device in this embodiment of this application is shown in FIG. 10. The microphone array in the audio interaction device samples audio signals to obtain a plurality of audio signals.

That is, microphones mic-1, mic-2, . . . , mic-N of the array respectively obtain a plurality of voice signals m1(t), m2(t), . . . , mN(t) through sampling, and input the voice signals into a linear echo cancellation module 910.

The linear echo cancellation module 910 completes echo cancellation according to an extracted echo reference signal r(t), to obtain echo-canceled audio signals $S1(t)$, $S2(t)$, . . . , SN(t), and further inputs the audio signals into a time-frequency analysis module 930.

After time-frequency analysis is performed on the plurality of echo-canceled audio signals $S1(t)$, $S2(t)$, . . . , SN(t) by using the time-frequency analysis module, corresponding time-frequency domain expressions, that is, $S1(n,f)$, S2(n,f), ..., SN(n,f), can be obtained and inputted into a spatial spectrum estimation module 970.

Figure 11:
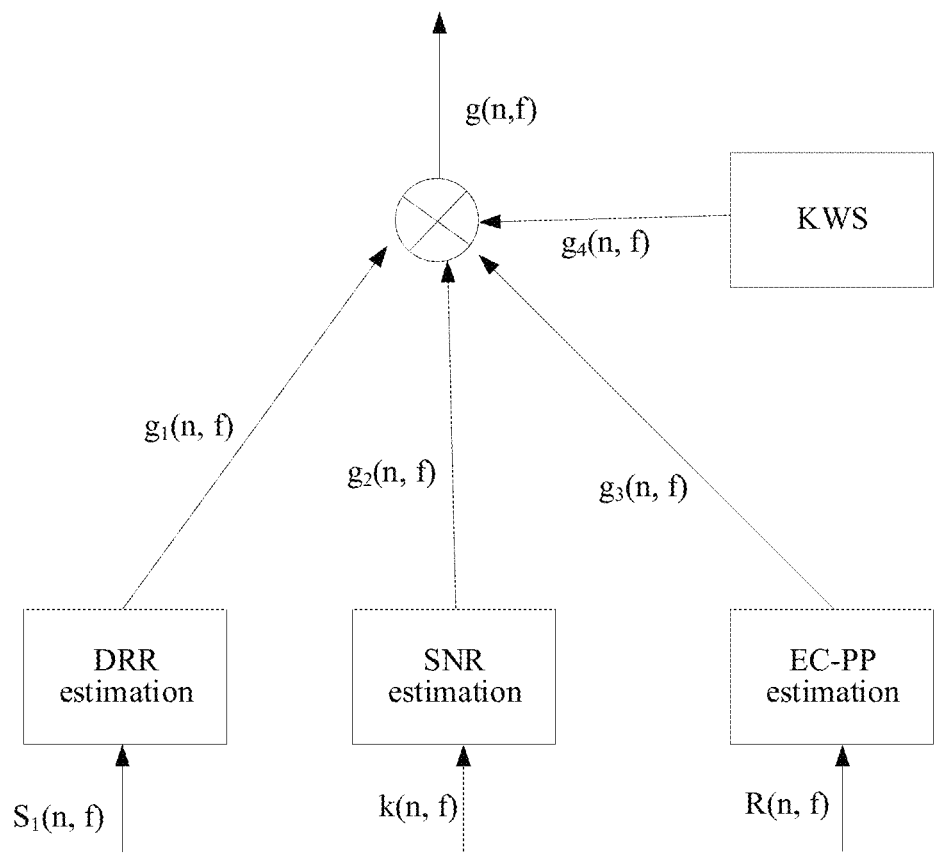
FIG. 11 is a schematic diagram of a weighted-estimation module according to an exemplary embodiment.

For the time-frequency domain expressions S1(n,f), S2(n,f), ..., SN(n,f) of the audio signals, a weighted-estimation module 950 obtains a weighted covariance matrix by using KWS information, a time-frequency domain expression R(n,f) of the echo reference signal, as well as DRR estimation, SNR estimation, and EC-PP estimation. FIG. 11 is a schematic diagram of a weighted-estimation module according to an exemplary embodiment, to obtain weights forming the weighted covariance matrices.

Specifically, the plurality of obtained weights are synthesized in a multiplying manner, as shown in the following formula:

$$g(n, f) = \prod_{i=1}^{4} g_i(n, f)$$

Based on this, it can be ensured that a corresponding weight may be close to 1 only when a DRR estimate, an SER, and an SNR of a time-frequency point are all relatively high, and the weight of the time-frequency point is close to 0 when any weight is relatively small, to increase a relative proportion of a target-audio direct signal in the weighted covariance matrix, and reduce impact of an interference signal on the spatial spectrum estimation.

For a spatial spectrum, it is to be understood that a spatial angle θ is a continuous variable (there are numerous azimuths). Therefore, it is impossible to calculate a spatial spectrum p(θ) for each azimuth. In an actual engineering application, a limited quantity of azimuths $θ_i$, i=1, 2, ..., $N_θ$ are usually selected ($N_θ$ is a quantity of the selected azimuths), and a spatial spectrum in a corresponding direction is calculated.

Through the implementation of this embodiment of this application, the spatial spectrum estimation module estimates a spatial spectrum based on a target-audio direct signal $s_d$, a reverberation reflection signal $s_r$ of target audio, direct and reflection components $n_{dr}$ of a noise signal, and a residual echo signal e by using a weight g(n,f). g(n,f) is relatively large at a time-frequency point at which $s_d$ is dominant. g(n,f) is relatively small at a time-frequency point at which $s_d$ is covered by $s_r$, $n_{dr}$, or e. In this way, a relative proportion of the target-audio direct signal $s_d$ in a weighted covariance matrix G($n_0$, $n_1$, f) is improved, to reduce interference of interference signals (including $s_r$, $n_{dr}$, and e) to the spatial spectrum estimation, and finally improve the robustness of the azimuth estimation algorithm in a complex scenario.

The following is an apparatus embodiment of this application, which is used for executing the foregoing method embodiments of this application. For details not disclosed in the apparatus embodiments of this application, refer to the other method embodiments of this application.

Figure 12:
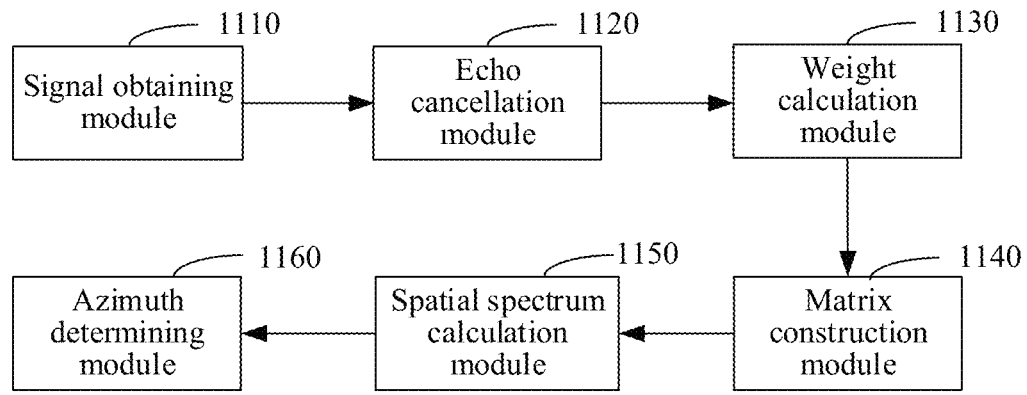
FIG. 12 is a block diagram of a sound source azimuth calculation apparatus according to an exemplary embodiment.

FIG. 12 is a block diagram of a sound source azimuth calculation apparatus according to an exemplary embodiment. In an exemplary embodiment, as shown in FIG. 12, the sound source azimuth calculation apparatus includes, but is not limited to: a signal obtaining module 1110, an echo cancellation module 1120, a weight calculation module 1130, a matrix construction module 1140, a spatial spectrum calculation module 1150, and an azimuth determining module 1160.

The signal obtaining module 1110 is configured to obtain audio signals.

The audio signals are audio signals in a plurality of directions in a space and include a target-audio direct signal.

The echo cancellation module 1120 is configured to perform echo cancellation on the audio signals.

The weight calculation module 1130 is configured to obtain weights of a plurality of time-frequency points in the echo-canceled audio signals by using features of the audio signals, a weight of each time-frequency point indicating a relative proportion of the target-audio direct signal in the audio signals at the time-frequency point.

The spatial spectrum calculation module 1150 is configured to weight, for an audio signal in each direction in the plurality of directions, time-frequency components of the audio signal at the plurality of time-frequency points separately by using the weights of the plurality of time-frequency points, to obtain weighted signal energy of the audio signal in the each direction.

In some embodiments, the weight calculation module 1130 may obtain time-frequency domain expressions of the echo-canceled audio signals and weights of time-frequency points. The apparatus may further include the matrix construction module 1140, configured to calculate a weighted covariance matrix corresponding to the time-frequency point based on the weights of the time-frequency points and the time-frequency domain expressions, the weighted covariance matrix being used for describing the relative proportion of a target-audio direct signal in the audio signals. The spatial spectrum calculation module 1150 is configured to perform weighted calculation on a spatial spectrum by using the weighted covariance matrix, to obtain a spatial spectrum of the audio signals weighted at the plurality of time-frequency points. The azimuth determining module 1160 is configured to obtain a sound source azimuth corresponding to the target-audio direct signal in the audio signals according to the spatial spectrum.

Figure 13:
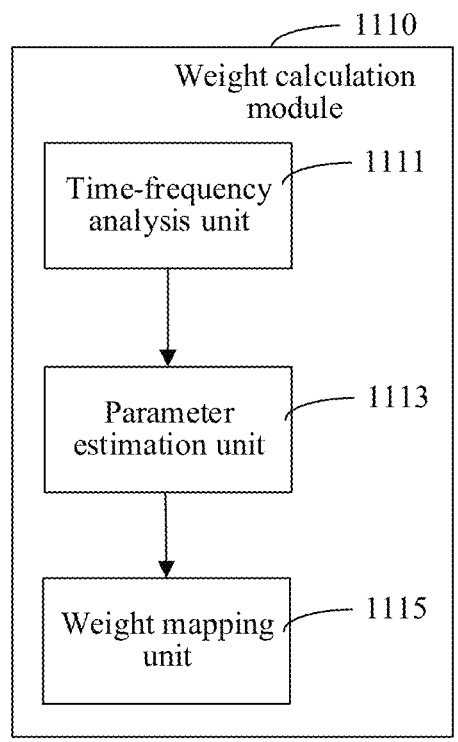
FIG. 13 is a block diagram of describing a weight calculation module shown in the corresponding embodiment of FIG. 12.

FIG. 13 is a block diagram of describing a weight calculation module shown in the corresponding embodiment of FIG. 12. In an exemplary embodiment, as shown in FIG. 13, a weight calculation module 1110 includes a time-frequency analysis unit 1111, a parameter estimation unit 1113, and a weight mapping unit 1115.

The time-frequency analysis unit 1111 is configured to obtain time-frequency domain expressions of the audio signals.

The parameter estimation unit 1113 is configured to estimate an audio feature parameter according to the time-frequency point for the time-frequency domain expressions of the audio signals.

The weight mapping unit 1115 is configured to obtain weights of the audio signals at the time-frequency point according to the audio feature parameter corresponding to the time-frequency point.

In an exemplary embodiment, the audio feature parameter includes an SNR estimate of the time-frequency domain expressions at the time-frequency point. The parameter estimation unit 1111 is further configured to estimate an SNR estimate of each time-frequency point for the time-frequency domain expressions of the audio signals, the SNR estimate being used for obtaining the weights of the audio signals at the time-frequency point through mapping.

Figure 14:
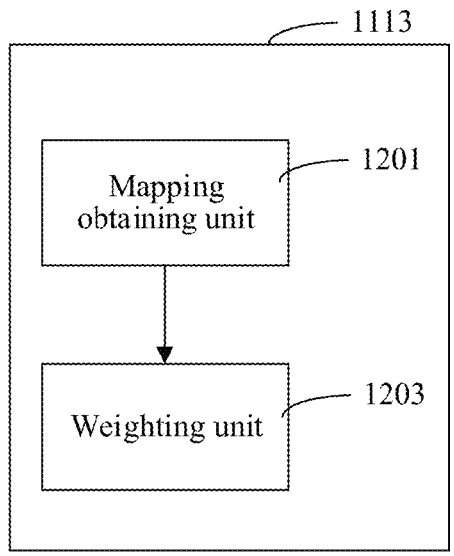
FIG. 14 is a block diagram of describing a weight mapping unit shown in the corresponding embodiment of FIG. 12.

FIG. 14 is a block diagram of describing a weight mapping unit shown in the corresponding embodiment of FIG. 12. In an exemplary embodiment, there are a plurality of types of audio feature parameters. As shown in FIG. 14, the weight mapping unit 1113 includes a mapping obtaining unit 1201 and a weighting unit 1203.

The mapping obtaining unit 1201 is configured to obtain weights mapped respectively by different audio feature parameters of the time-frequency domain expressions of the audio signals at the time-frequency point.

The weighting unit 1203 is configured to perform weighted calculation on the obtained weights, to obtain weights of the audio signals at the time-frequency point.

In an exemplary embodiment, the audio feature parameter includes a probability that the time-frequency point corresponds to a target wakeup word. The parameter estimation unit 1113 is further configured to spot a target wakeup word in the audio signals, and estimate a time-frequency point at which the spotted target wakeup word is located, to obtain the probability that each time-frequency point corresponds to the target wakeup word.

In an exemplary embodiment, the matrix construction module is further configured to perform weighted calculation on the time-frequency domain expressions and the weights of the audio signals at the time-frequency point, to obtain weighted element values corresponding to the time-frequency point in the weighted covariance matrix, the weighted element values corresponding to the time-frequency point forming the weighted covariance matrix.

Figure 15:
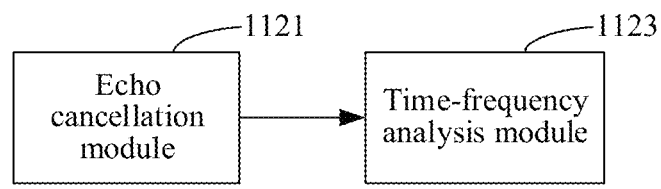
FIG. 15 is a block diagram of an echo cancellation module according to another exemplary embodiment.

FIG. 15 is a block diagram of a sound source azimuth calculation apparatus according to another exemplary embodiment. In another exemplary embodiment, as shown in FIG. 15, the echo cancellation module 1120 includes an echo cancellation module 1121 and a time-frequency analysis module 1123.

The echo cancellation module 1121 is configured to obtain an echo reference signal from an audio interaction device, and perform linear echo cancellation on audio signals collected by a microphone based on the echo reference signal.

The time-frequency analysis module 1123 is configured to perform time-frequency analysis after echo-cancellation is performed on the audio signals, to obtain time-frequency domain expressions of the echo-canceled audio signals.

Figure 16:
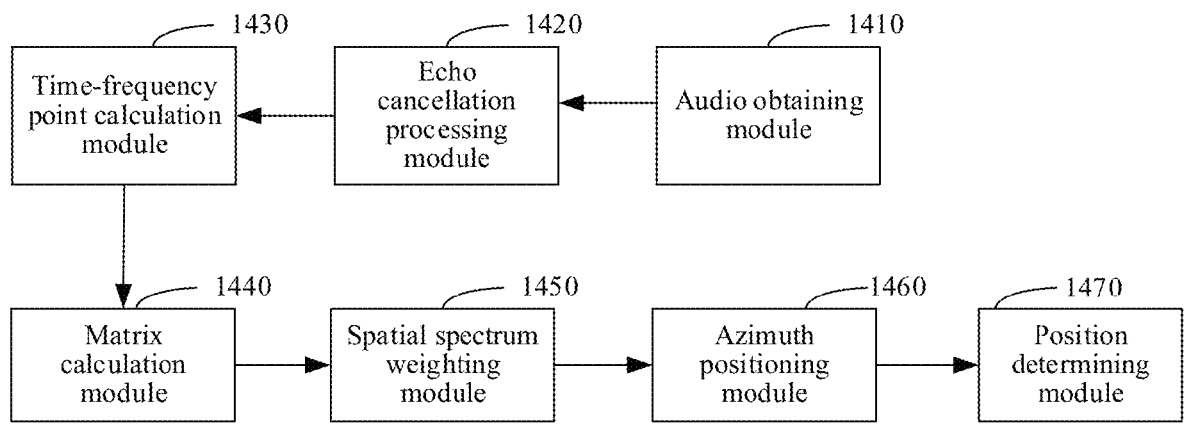
FIG. 16 is a block diagram of an apparatus for positioning target audio by an audio interaction device according to an exemplary embodiment.

FIG. 16 is a block diagram of an apparatus for positioning target audio by an audio interaction device according to an exemplary embodiment. In an exemplary embodiment, as shown in FIG. 16, the apparatus for positioning target audio by an audio interaction device includes an audio obtaining module 1410, an echo cancellation processing module 1420, a time-frequency point calculation module 1430, a matrix calculation module 1440, a spatial spectrum weighting module 1450, an azimuth positioning module 1460, and a position determining module 1470.

The audio obtaining module 1410 is configured to obtain audio signals.

The audio signals may be audio signals in a plurality of directions in a space and include a target-audio direct signal.

The echo cancellation processing module 1420 is configured to perform echo cancellation on the audio signals.

The time-frequency point calculation module 1430 is configured to obtain weights of a plurality of time-frequency points in the echo-canceled audio signals by using features of the audio signals, a weight of each time-frequency point indicating a relative proportion of the target-audio direct signal in the audio signals at the time-frequency point.

The spatial spectrum weighting module 1450 is configured to weight, for an audio signal in each direction in the plurality of directions, time-frequency components of the audio signal at the plurality of time-frequency points separately by using the weights of the plurality of time-frequency points, to obtain weighted signal energy of the audio signal in the each direction.

The azimuth positioning module 1460 is configured to obtain a sound source azimuth corresponding to the target audio in audio interaction by using the weighted signal energy of the audio signal in the each direction.

The position determining module 1470 is configured to position a sound source position of the target audio in the audio interaction according to the sound source azimuth.

In some embodiments, the time-frequency point calculation module 1430 is configured to obtain time-frequency domain expressions of the echo-canceled audio signals and weights of the time-frequency points, the audio signals being obtained by a microphone in the audio interaction device through sampling. The apparatus may further include the matrix calculation module 1440, configured to obtain a weighted covariance matrix of the audio signals corresponding to the time-frequency point based on the weights of the time-frequency points and the time-frequency domain expressions, the weighted covariance matrix being used for describing the relative proportion of a target-audio direct signal in the audio signals. The spatial spectrum weighting module 1450 is configured to perform weighted calculation on a spatial spectrum by using the weighted covariance matrix, to obtain a spatial spectrum of the audio signals weighted at the plurality of time-frequency points. The azimuth positioning module 1460 is configured to obtain a sound source azimuth corresponding to target audio in audio interaction according to the spatial spectrum.

Optionally, an embodiment of this application further provides an audio interaction device. The audio interaction device may be applied to the implementation environment shown in FIG. 1, to perform all or some of the steps in the method shown in any one of FIG. 3, FIG. 5, FIG. 6, FIG. 7, FIG. 8, and FIG. 9. The apparatus includes:

a processor; and a memory, configured to store instructions on the processor, the processor being configured to implement the foregoing method.

A specific implementation of operations performed by the processor of the apparatus in this embodiment is described in detail in the foregoing embodiments. Details are not described herein.

Hardware modules in the embodiments may be implemented by hardware or a hardware platform combined with software. The software includes machine-readable instructions, stored in a non-volatile storage medium. Therefore, the embodiments may alternatively be reflected as software products.

In the embodiments, the hardware may be implemented by dedicated hardware or hardware executing the machine-readable instructions. For example, the hardware may be a permanent circuit or logical device (for example, a special-purpose processor, such as an FPGA or an ASIC) that is specially designed to perform particular operations. Alternatively, the hardware may include a programmable logic device or circuit (for example, including a general-purpose processor or another programmable processor) that is temporarily configured by software to perform particular operations.

The machine-readable instruction corresponding to a module in the figure may enable an operating system and the like operated on a computer to complete some or all operations described herein. A non-volatile computer-readable storage medium may be a memory disposed in an extension board inserted into the computer or a memory disposed in an extension unit connected to the computer. A CPU and the like installed on the extension board or the extension unit can perform some or all actual operations according to the instructions.

The non-volatile computer-readable storage medium include a floppy disk, a hard disk, a magneto-optical disk, an optical disk (such as CD-ROM, CD-R, CD-RW, DVD-ROM, DVD-RAM, DVD-RW, and DVD+RW), a tape, a non-volatile memory card, and a ROM. Optionally, the program code may be downloaded from a server computer by using a communication network.

It is to be understood that this application is not limited to the precise structures described above and shown in the accompanying drawings, and various modifications and changes may be made without departing from the scope of this application. The scope of the embodiments of this application is merely limited by the appended claims.

What is claimed is:

1. An audio recognition method, comprising:
   obtaining audio signals collected in a plurality of directions in a space, the audio signals comprising a target-audio direct signal;
   performing echo cancellation on the audio signals;
   obtaining weights of a plurality of time-frequency points in the echo-canceled audio signals, a respective weight of each time-frequency point indicating a relative proportion of the target-audio direct signal in the echo-canceled audio signals at the time-frequency point;
   weighting time-frequency components of the audio signals at the plurality of time-frequency points separately for each of the plurality of directions by using the weights of the plurality of time-frequency points, to obtain a weighted audio signal energy distribution of the audio signals in the plurality of directions, further including:
      obtaining a weighted covariance matrix of each of the plurality of time-frequency points based at least in part on the obtained weights of the plurality of time-frequency points, starting and ending time points of a target wakeup word in the echo-canceled audio signals, and time-frequency domain expressions of the echo-canceled audio signals; and
      performing weighted calculation on a spatial spectrum of the audio signals by using the weighted covariance matrix, to obtain the spatial spectrum of the audio signals weighted at the plurality of time-frequency points;
   obtaining a sound source azimuth corresponding to the target-audio direct signal in the audio signals by using the weighted audio signal energy distribution of the audio signals in the plurality of directions; and
   performing audio recognition to the audio signals based on the sound source azimuth corresponding to the target-audio direct signal.

2. The method according to claim 1, wherein
   the weighted covariance matrix is used for describing the relative proportion of the target-audio direct signal in the audio signals.

3. The method according to claim 1, wherein the obtaining weights of a plurality of time-frequency points in the echo-canceled audio signals comprises:
   obtaining time-frequency domain expressions of the audio signals;
   estimating an audio feature parameter according to each time-frequency point for the time-frequency domain expressions of the audio signals; and
   obtaining weights of the audio signals at the time-frequency point according to the audio feature parameter corresponding to the time-frequency point.

4. The method according to claim 3, wherein the audio feature parameter comprises a signal-to-noise ratio (SNR) estimate of the time-frequency domain expressions at the time-frequency point, and the estimating an audio feature parameter according to the time-frequency point for the time-frequency domain expressions of the audio signals comprises:
   estimating an SNR estimate of each time-frequency point for the time-frequency domain expressions of the audio signals, the SNR estimate being used for obtaining the weights of the audio signals at the time-frequency point through mapping.

5. The method according to claim 3, wherein there are a plurality of audio feature parameters, and the obtaining weights of the audio signals at the time-frequency point according to the audio feature parameter corresponding to the time-frequency point comprises:
   obtaining weights mapped respectively by different audio feature parameters of the time-frequency domain expressions of the audio signals at the time-frequency point; and
   performing weighted calculation on the obtained weights, to obtain weights of the audio signals at the time-frequency point.

6. The method according to claim 5, wherein the audio feature parameter further comprises at least one or any combination of a direct-to-reverb ratio (DRR) and a residual echo signal estimate of the time-frequency domain expression at the time-frequency point and a probability that the time-frequency point corresponds to the target wakeup word.

7. The method according to claim 6, wherein the audio feature parameter comprises the probability that the time-frequency point corresponds to the target wakeup word, and the estimating an audio feature parameter according to the time-frequency point for the time-frequency domain expressions of the audio signals comprises:
   spotting the target wakeup word in the audio signals, and estimating a time-frequency point at which the spotted target wakeup word is located, to obtain a probability that each time-frequency point corresponds to the target wakeup word.

8. The method according to claim 1, wherein obtaining the weighted covariance matrix of each of the plurality of time-frequency points comprises:
   performing weighted calculation on the time-frequency domain expressions and the weights of the echo-canceled audio signals at the time-frequency point, to obtain weighted element values corresponding to the time-frequency point in the weighted covariance matrix, the weighted element values corresponding to the time-frequency point forming the weighted covariance matrix.

9. The method according to claim 1, wherein the performing echo cancellation on the audio signals comprises:
   obtaining an echo reference signal from an audio interaction device;
   performing, by using the echo reference signal, linear echo cancellation on the audio signals; and
   performing time-frequency analysis on the echo-canceled audio signals, to obtain time-frequency domain expressions of the echo-canceled audio signals.

10. An audio interaction device, comprising:
a processor; and
a memory, the memory storing computer-readable instructions, the computer-readable instructions, when executed by the processor, cause the audio interaction device to perform a plurality of operations including:
obtaining audio signals collected in a plurality of directions in a space, the audio signals comprising a target-audio direct signal;
performing echo cancellation on the audio signals;
obtaining weights of a plurality of time-frequency points in the echo-canceled audio signals, a respective weight of each time-frequency point indicating a relative proportion of the target-audio direct signal in the echo-canceled audio signals at the time-frequency point;
weighting time-frequency components of the audio signals at the plurality of time-frequency points separately for each of the plurality of directions by using the weights of the plurality of time-frequency points, to obtain a weighted audio signal energy distribution of the audio signals in the plurality of directions, further including:
obtaining a weighted covariance matrix of each of the plurality of time-frequency points based at least in part on the obtained weights of the plurality of time-frequency points, starting and ending time points of a target wakeup word in the echo-canceled audio signals, and time-frequency domain expressions of the echo-canceled audio signals; and
performing weighted calculation on a spatial spectrum of the audio signals by using the weighted covariance matrix, to obtain the spatial spectrum of the audio signals weighted at the plurality of time-frequency points;
obtaining a sound source azimuth corresponding to the target-audio direct signal in the audio signals by using the weighted audio signal energy distribution of the audio signals in the plurality of directions; and
performing audio recognition to the audio signals based on the sound source azimuth corresponding to the target-audio direct signal.

11. The audio interaction device according to claim 10, wherein
the weighted covariance matrix is used for describing the relative proportion of the target-audio direct signal in the audio signals.

12. The audio interaction device according to claim 10, wherein the obtaining weights of a plurality of time-frequency points in the echo-canceled audio signals comprises:
obtaining time-frequency domain expressions of the audio signals;
estimating an audio feature parameter according to each time-frequency point for the time-frequency domain expressions of the audio signals; and
obtaining weights of the audio signals at the time-frequency point according to the audio feature parameter corresponding to the time-frequency point.

13. The audio interaction device according to claim 12, wherein the audio feature parameter comprises a signal-to-noise ratio (SNR) estimate of the time-frequency domain expressions at the time-frequency point, and the estimating an audio feature parameter according to the time-frequency point for the time-frequency domain expressions of the audio signals comprises:
estimating an SNR estimate of each time-frequency point for the time-frequency domain expressions of the audio signals, the SNR estimate being used for obtaining the weights of the audio signals at the time-frequency point through mapping.

14. The audio interaction device according to claim 12, wherein there are a plurality of audio feature parameters, and the obtaining weights of the audio signals at the time-frequency point according to the audio feature parameter corresponding to the time-frequency point comprises:
obtaining weights mapped respectively by different audio feature parameters of the time-frequency domain expressions of the audio signals at the time-frequency point; and
performing weighted calculation on the obtained weights, to obtain weights of the audio signals at the time-frequency point.

15. The audio interaction device according to claim 14, wherein the audio feature parameter further comprises at least one or any combination of a direct-to-reverb ratio (DRR) and a residual echo signal estimate of the time-frequency domain expression at the time-frequency point and a probability that the time-frequency point corresponds to the target wakeup word.

16. The audio interaction device according to claim 15, wherein the audio feature parameter comprises the probability that the time-frequency point corresponds to the target wakeup word, and the estimating an audio feature parameter according to the time-frequency point for the time-frequency domain expressions of the audio signals comprises:
spotting the target wakeup word in the audio signals, and estimating a time-frequency point at which the spotted target wakeup word is located, to obtain a probability that each time-frequency point corresponds to the target wakeup word.

17. The audio interaction device according to claim 10, wherein obtaining the weighted covariance matrix of each of the plurality of time-frequency points comprises:
performing weighted calculation on the time-frequency domain expressions and the weights of the echo-canceled audio signals at the time-frequency point, to obtain weighted element values corresponding to the time-frequency point in the weighted covariance matrix, the weighted element values corresponding to the time-frequency point forming the weighted covariance matrix.

18. The audio interaction device according to claim 10, wherein the performing echo cancellation on the audio signals comprises:
obtaining an echo reference signal from an audio interaction device;
performing, by using the echo reference signal, linear echo cancellation on the audio signals; and
performing time-frequency analysis on the echo-canceled audio signals, to obtain time-frequency domain expressions of the echo-canceled audio signals.

19. A non-transitory computer readable medium, storing computer-readable instructions, the computer readable instructions being executable by one or more processors of an audio interaction device to perform a plurality of operations including:
obtaining audio signals collected in a plurality of directions in a space, the audio signals comprising a target-audio direct signal;
performing echo cancellation on the audio signals;
obtaining weights of a plurality of time-frequency points in the echo-canceled audio signals, a respective weight of each time-frequency point indicating a relative proportion of the target-audio direct signal in the echo-canceled audio signals at the time-frequency point;

weighting time-frequency components of the audio signals at the plurality of time-frequency points separately for each of the plurality of directions by using the weights of the plurality of time-frequency points, to obtain a weighted audio signal energy distribution of the audio signals in the plurality of directions, further including:

obtaining a weighted covariance matrix of each of the plurality of time-frequency points based at least in part on the obtained weights of the plurality of time-frequency points, starting and ending time points of a target wakeup word in the echo-canceled audio signals, and time-frequency domain expressions of the echo-canceled audio signals; and performing weighted calculation on a spatial spectrum of the audio signals by using the weighted covariance matrix, to obtain the spatial spectrum of the audio signals weighted at the plurality of time-frequency points;

obtaining a sound source azimuth corresponding to the target-audio direct signal in the audio signals by using the weighted audio signal energy distribution of the audio signals in the plurality of directions; and performing audio recognition to the audio signals based on the sound source azimuth corresponding to the target-audio direct signal.

20. The non-transitory computer readable medium according to claim 19, wherein the weighted covariance matrix is used for describing the relative proportion of the target-audio direct signal in the audio signals.

* * * * *